(12) United States Patent
Riza

(10) Patent No.: US 6,859,578 B2
(45) Date of Patent: Feb. 22, 2005

(54) FAULT-TOLERANT FIBER-OPTICAL MULTIWAVELENGTH PROCESSOR

(75) Inventor: Nabeel Agha Riza, Oviedo, FL (US)

(73) Assignee: Nuonics, Inc., Winter Park, FL (US)

( * ) Notice: Subject to any disclaimer, the term of this patent is extended or adjusted under 35 U.S.C. 154(b) by 140 days.

(21) Appl. No.: 10/151,693

(22) Filed: May 17, 2002

(65) Prior Publication Data

US 2002/0172465 A1 Nov. 21, 2002

Related U.S. Application Data

(60) Provisional application No. 60/292,249, filed on May 18, 2001.

(51) Int. Cl.$^7$ .................................................. G02B 6/26
(52) U.S. Cl. ......................................... 385/18; 359/225
(58) Field of Search ............................... 398/45, 48–50, 398/85; 385/15–18; 359/225

(56) References Cited

U.S. PATENT DOCUMENTS

| | | |
|---|---|---|
| 3,548,050 A | 12/1970 | Mozer |
| 4,208,094 A | 6/1980 | Tomlinson, III et al. |
| 4,303,302 A | 12/1981 | Ramsey et al. |
| 4,304,460 A | 12/1981 | Tanaka et al. |
| 4,365,863 A | 12/1982 | Broussaud |
| 4,484,793 A | 11/1984 | Laude |
| 4,580,873 A | 4/1986 | Levinson |
| 4,626,066 A | 12/1986 | Levinson |
| 4,932,745 A | 6/1990 | Blonder |
| 5,042,889 A | 8/1991 | Benzoni |
| 5,155,778 A | 10/1992 | Magel et al. |
| 5,199,088 A | 3/1993 | Magel |
| 5,208,880 A | 5/1993 | Riza et al. |
| 5,359,683 A | 10/1994 | Pan |
| 5,367,584 A | 11/1994 | Ghezzo et al. |
| 5,621,829 A | 4/1997 | Ford |
| 5,699,463 A | 12/1997 | Yang et al. |
| 5,745,271 A | 4/1998 | Ford et al. |
| 5,745,634 A | 4/1998 | Garrett et al. |
| 5,774,604 A | 6/1998 | McDonald |
| 5,838,847 A | 11/1998 | Pan et al. |
| 5,841,917 A | 11/1998 | Jungerman et al. |
| 5,900,983 A | 5/1999 | Ford et al. |
| 5,915,063 A | 6/1999 | Colbourne et al. |

(List continued on next page.)

Primary Examiner—Joseph Williams
Assistant Examiner—Peter Macchiraolo
(74) Attorney, Agent, or Firm—James H. Beusse; Beusse Brownlee Wolter Mora & Maire, P.A.

(57) ABSTRACT

Multi-wavelength fiber-optic processors based on a fault-tolerant scheme using a macro-pixel to control an optical beam are described. The macro-pixel system uses multiple device pixels per beam to provide a robust digital technique for amplitude control and routing, enabling a module with high optical beam alignment tolerance and resistance to catastropic failure. In one embodiment, the macropixel is implemented via small tilt micromirrors fabricated via optical microelectromechanical systems (MEMS) technology. The system includes fault tolerant fiber-optic processors that can implement add-drop wavelength routing, optical power level conditioning per wavelength, 2×2 optical crossconnects, and 1×N and M×N type broadcast-gain controlled switches. The system can simultaneously and independently implement optical power conditioning and wavelength routing for any wavelength channel. An optical signal processor is constructed using a fiber lens collimator, optical fibers butt-coupled to the fiber lens, and an optical MEMS-based macro-pixel device with three independently controllable tilt mirror states. Multiple processors can be interconnected to realize a crossconnect subsystem of multiple attenuators and switches that can be applied to N-wavelength multiplexed fiber-optic networks or to form broadcast 1×N and M×N optical switches with independent gain controls.

10 Claims, 5 Drawing Sheets

U.S. PATENT DOCUMENTS

| | | | |
|---|---|---|---|
| 5,943,454 A | 8/1999 | Aksyuk et al. | |
| 5,960,133 A | 9/1999 | Tomlinson | |
| 5,974,207 A | 10/1999 | Aksyuk et al. | |
| 5,995,688 A | 11/1999 | Aksyuk et al. | |
| 6,002,818 A | 12/1999 | Fatehi et al. | |
| 6,031,946 A | 2/2000 | Bergmann et al. | |
| 6,075,239 A | 6/2000 | Aksyuk et al. | |
| 6,097,859 A | 8/2000 | Solgaard et al. | |
| 6,097,860 A | 8/2000 | Laor | |
| 6,108,466 A | 8/2000 | Aksyuk et al. | |
| 6,204,946 B1 * | 3/2001 | Aksyuk et al. | 398/9 |
| 6,222,954 B1 | 4/2001 | Riza | |
| 6,253,001 B1 * | 6/2001 | Hoen | 385/17 |
| 6,282,336 B1 | 8/2001 | Riza | |
| 6,430,331 B1 * | 8/2002 | Hagelin et al. | 385/17 |
| 6,445,841 B1 * | 9/2002 | Gloeckner et al. | 385/17 |
| 6,493,139 B1 * | 12/2002 | Liu et al. | 359/484 |
| 6,560,000 B2 * | 5/2003 | Iyer et al. | 359/238 |
| 6,567,574 B1 * | 5/2003 | Ma et al. | 385/16 |
| 6,657,770 B2 * | 12/2003 | Marom et al. | 359/290 |
| 6,694,073 B2 * | 2/2004 | Golub et al. | 385/18 |
| 6,707,961 B1 * | 3/2004 | Heanue | 385/18 |
| 6,750,655 B2 * | 6/2004 | Staple et al. | 324/415 |

* cited by examiner

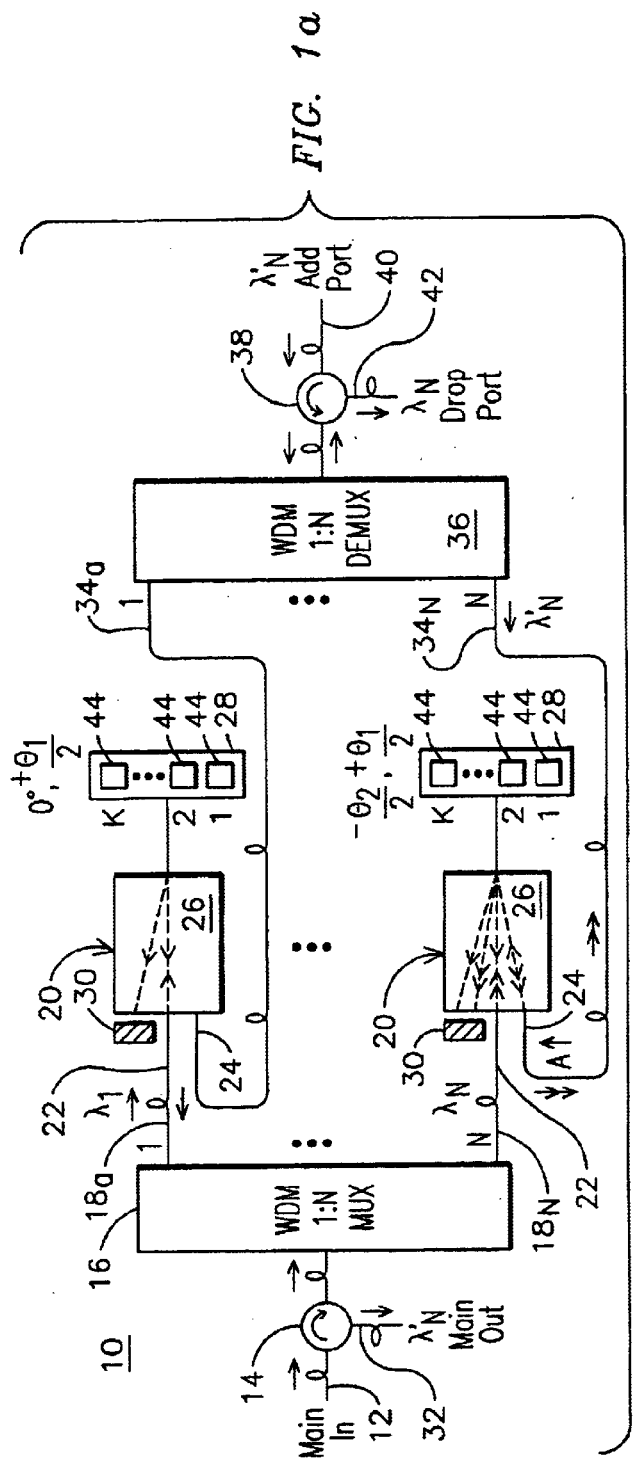
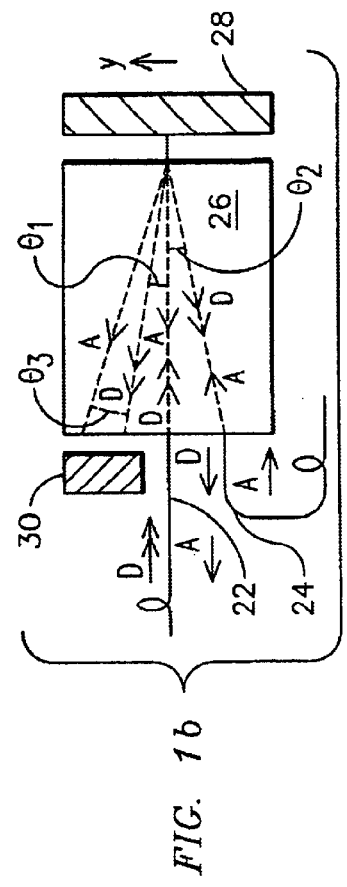
FIG. 1a
FIG. 1b

1:N Multi-broadcast    M:1 FO
Switch and Gain        Beam Combiner
Controller

FAULT-TOLERANT FIBER-OPTICAL MULTIWAVELENGTH PROCESSOR

This application claims the benefit of U.S. provisional patent application, Ser. No. 60/292,249, filed May 18, 2001.

FIELD OF INVENTION

This invention relates to fiber-optic (FO) processors using micromirror controls and, more particularly, to macro-pixel optical MEMS device-based FO processor structures used for implementing add-drop wavelength routing, 2×2 cross-connect switching, and wavelength optical gain controls for light signal processing in various optical networks such as wavelength division multiplexed (WDM) optical communications, distributed sensor networks, and photonic signal processing systems requiring optical routing and gain control.

BACKGROUND OF INVENTION

It is well known that an excellent choice for light control is via the use of mirrors. Mirrors provide high reflectivity over broad bandwidths, as desired in WDM systems. Today, an excellent method for making actively controlled mirrors is via microelectromechanical system (MEMS) technology that promises to offer low cost compact optical modules via the use of low cost batch fabrication techniques similar to semiconductor electronic chip production methods. MEMS technology has been previously proposed to realize fiber optic beam control modules.

Various FO switches have been proposed using optical MEMS technology. The include 2×2 structures, wavelength add-drop (A-D) filters, and N×N crossconnects. For example, 2×2 type switches have been described in M. F. Dautartas, A. M. Benzoni, Y. C. Chen, G. E. Blonder, B. H. Johnson, C. R. Paola, E. Rice, and Y.-H. Wong, "A silicon-based moving-mirror optical switch," *Journal of Lightwave Technology*, Vol. 10, No. 8, pp. 1078–1085, August 1992; and N. A. Riza and D. L. Polla, "Microdynamical fiber-optic switch," U.S. Pat. No. 5,208,880, May 4, 1993, FO switches are proposed using the electronically controlled actuation of a single micromirror fabricated using micromaching techniques used in MEMS chip fabrication. More recently, others have used this "single micromirror per optical beam" control approach to realize 1×N and 2×2 switches. These works using MEMS or other mechanical means are described in W. J. Tomlinson and R. E. Wagner, "Optical switch," U.S. Pat. No. , 4,208,094, Jun. 17, 1980; H. J. Ramsey and M. L. Dakss, "Piezoelectric optical switch," U.S. Pat. No. , 4,303,302, Dec. 1, 1981; T. Tanaka, Y. Tsujimoto, H. Serizawa, and K. Hattori, "Optical switching device," U.S. Pat. No. 4,304,460, Dec. 8, 1981; J. -P. Laude, "Switching device between optical fibers," U.S. Pat. No. 4,484,793, Nov. 27, 1984; F. H. Levinson, "Optical coupling device utilizing a mirror and cantilevered arm," U.S. Pat. No. 4,626,066, Dec. 2, 1986; G. E. Blonder, "Radiation switching arrangement with moving deflecting element," U.S. Pat. No. 4,932,745, Jun. 12, 1990; A. M. Benzoni, "Magnetic activation mechanism for an optical switch," U.S. Pat. No. 5,042,889, Aug. 27, 1991; G. A. Magel and T. G. McDonald, "Optical switch using spatial light modulators," U.S. Pat. No. 5,155,778, Oct. 13, 1992; G. A. Magel, "Fiber optic switch with spatial light modulator device," U.S. Pat. No. 5,199,088, Mar. 30, 1993; J. J. Pan, "1×N Electromechanical optical switch," U.S. Pat. No. 5,359,683, Oct. 25, 1994; M. Ghezzo, C. P. Yakymyshyn, and A. R. Duggal, "Integrated microelectromechanical polymeric photonic switching arrays," U.S. Pat. No. 5,367,584, Nov. 22, 1994; J. E. Ford, "Fiber optic switching device and method using free space scanning," U.S. Pat. No. 5,621,829, Apr. 15, 1997; L. Yang, G. R. Trott, K. Shubert, K. Salomaa, and K. W. Carey, "Mechanical fiber optic switch," U.S. Pat. No. 5,699,463, Dec. 16, 1997; T. G. McDonald, "Using an asymmetric element to create a 1×N optical switch," U.S. Pat. No. 5,774,604, Jun. 30, 1998; J.-J. Pan, J.-Y. Xu, and C. J.-L. Yang, "Efficient electromechanical optical switches," U.S. Pat. No. 5,838,847, Nov. 17, 1998; V. A. Aksyuk, D. J. Bishop, J. E. Ford, and J. A. Walker, "Freespace optical bypass-exchange switch," U.S. Pat. No. 5,943,454, Aug. 24, 1999; V. A. Aksyuk, D. J. Bishop, and C. Randy, "Micromachined optical switch with tapered ends," U.S. Pat. No. 6,108,466, Aug. 22, 2000.

Other related works on switching includes E. Ollier, C. Chabrol, T. Enot, P. Brunet-Manquat, J. Margail, and P. Mottier, "1×8 Micro-mechanical switches based on moving waveguides for optical fiber network switching," 2000 IEEE/LEOS International Conference on Optical MEMS, pp. 39–40, Kauai, Hi., August 2000; R. T. Chen, H. Nguyen, and M. C. Wu, "A high-speed low-voltage stress-induced micromachined 2×2 optical switch," IEEE Photonics Technology Letters, Vol. 11, No. 11, pp. 1396–1398, November 1999; S. Nagaoka, "Compact latching-type single-mode-fiber switches fabricated by a fiber-micromachining technique and their practical applications," IEEE Journal of Selected Topics in Quantum Electronics, Vol. 5, No. 1, pp. 36–45, January/February 1999; A. A. Yasseen, J. N. Mitchell, J. F. Klemic, D. A. Smith, and M. Mehregany, "A rotary electrostatic micromirror 1×8 optical switch," IEEE Journal of Selected Topics in Quantum Electronics, Vol. 5, No. 1, pp. 26–32, January/February 1999; H. Toshiyoshi, D. Miyauchi, and H. Fujita, "Electromagnetic torsion mirrors for self-aligned fiber-optic crossconnectors by silicon micromachining," IEEE Journal of Selected Topics in Quantum Electronics, Vol. 5, No. 1, pp. 10–17, January/February 1999; M. Makihara, M. Sato, F. Shimokawa, and Y. Nishida, "Micromechanical optical switches based on thermocapillary integrated in waveguide substrate," Journal of Lightwave Technology, Vol. 17, No. 1, pp. 14–18, January 1999; S.-S. Lee, L. S. Huang, C.-J. Kim, and M. C. Wu, "Freespace fiber-optic switches based on MEMS vertical torsion mirrors," Journal of Lightwave Technology, Vol. 17, No. 1, pp. 7–13, January 1999; C. Marxer and N. F. de Rooij, "Micro-opto-mechanical 2×2 switch for single-mode fibers based on plasma-etched silicon mirror and electrostatic actuation," Journal of Lightwave Technology, Vol. 17, No. 1, pp. 2–6, January 1999; J. E. Ford and D. J. DiGiovanni, "1×N Fiber bundle scanning switch," IEEE Photonics Technology Letters, Vol. 10, No. 7, pp. 967–969, July 1998; V. Aksyuk, B. Barder, C. R. Giles, R. Ruel, L. Stulz, and D. Bishop, "Low insertion loss packaged and fibre connectorised MEMS reflective optical switch," Electronics Letters, Vol. 34, No. 14, pp. 1413–1414, July 1998; C. Marxer, C. Thio, M.-A. Gretillat, N. F. de Rooij, R. Battig, O. Anthamatten, B. Valk, and P. Vogel, "Vertical mirrors fabricated by deep reactive ion etching for fiber-optic switching applications," Journal of Microelectromechanical Systems, Vol. 6, No. 3, pp. 277–285, September 1997; R. A. Miller, Y. C. Tai, G. Xu, J. Bartha, and F. Lin, "An electromagnetic MEMS 2×2 fiber optic bypass switch," Transducers'97, pp. 89–92, Chicago, Ill., June 1997; S. S. Lee, E. Motamedi, and M. C. Wu, "Surface-micromachined free-space fiber optic switches with integrated microactuators for optical fiber communication systems," Transducers'97, pp. 85–87, Chicago, Ill., June 1997; H.

Toshiyoshi and H. Fujita, "Electrostatic micro torsion mirrors for an optical switch matrix," Journal of Microelectromechanical Systems, Vol. 5, No. 4, pp. 231–237, December 1996; S. S. Lee, L. Y. Lin, and M. C. Wu, "Surface-micromachined free-space fibre-optic switches," Electronics Letters, Vol. 31, No. 17, pp. 1481–1482, August 1995; L. A. Field, D. L. Burriesci, P. R. Robrish, and R. C. Ruby, "Micromachined 1×2 optical fiber switch," Transducers'95, pp. 344–347, Stockholm, Sweden, June 1995; R. M. Boysel, T. G. McDonald, G. A. Magel, G. C. Smith, and J. L. Leonard, "Integration of deformable mirror devices with optical fibers and waveguides," Proceedings of SPIE, Vol. 1793, pp. 34–39, 1992; K. Hogari and T. Matsumoto, "Electrostatically driven micromechanical 2×2 optical switch," Applied Optics, Vol. 30, No. 10, pp. 1253–1257, April 1991; K. Hogari and T. Matsumoto, "Electrostatically driven fiber-optic micromechanical on/off switch and its application to subscriber transmission systems," Journal of Lightwave Technology, Vol. 8, No. 5, pp. 722–727, May 1990.

Add-drop switches have also been proposed using MEMS. For instance, one such switching module is described in W. J. Tomlinson, "Wavelength-selective optical add/drop using tilting micromirrors," U.S. Pat. No. 5,960,133, Sep. 28, 1999; J. E. Ford, J. A. Walker, V. Aksyuk, and D. J. Bishop, "Wavelength selectable add/drop with tilting micromirrors," IEEE LEOS Annual Mtg., IEEE, N.J., postdeadline paperPD2.3, November 1997, where apart from the limitations of using a single micromirror per beam, this 4-port switch is not reversible and does not form a 2×2 switch that can be used to form larger N×N switch matrices. Other examples of add-drop switches using MEMS includes V. A. Aksyuk, B. P. Barber, D. J. Bishop, P. I. Gammel, C. R. Giles, "Micro-opto-mechanical devices and method thereof," U.S. Pat. No. 5,995,688, Nov. 30, 1999; C. R. Giles, B. Barber, V. Aksyuk, R. Ruel, L. Stulz, D. Bishop "Reconfigurable 16-channel WDM drop module sing silicon MEMS optical switches," *IEEE Photonics Technology Letters*, Vol. 11, No. 1, pp. 63–65, January 1999; V. A. Aksyuk, D. J. Bishop, J. E. Ford, R. E. Slusher, "Article comprising a wavelength selective add-drop multiplexer," U.S. Pat. No. 5,974,207, Oct. 26, 1999; C. Pu, L. Y. Lin, E. L. Goldstien, R. W. Tkach, "Micro-machined optical add/drop multiplexer with client configurability," 2000 *IEEE/LEOS International Conference on Optical MEMS*, pp. 35–36, Aug. 21–24, 2000. Similarly, in S. Glöckner, R. Goring, and T. Possner, "Micro-opto-mechanical beam deflectors," *Optical Engineering*, Vol. 36, No. 5, pp. 1339–1345, May 1997; P. M. Hagelin, U. Krishnamoorthy, J. P. Heritage, O. Solgaard, "Scalable optical cross-connect switch using micromachined mirrors," *IEEE Photonics Technology Letters*, Vol. 12, No. 7, pp. 882–884, July 2000; and L. Y. Lin, E. L. Goldstein, and R. W. Tkach, "Free-space micromachined optical switches with submillisecond switching time for large-scale optical crossconnects," *IEEE Photonics Technology Letters*, Vol. 10, No. 4, pp. 525–527, April 1998, a single micromirror per beam that can be rather large in size is used, leading to slow millisecond range switching speeds.

Other mechanically implemented optical crossconnects are described in P. M. Hagelin, U. Krishnamoorthy, J. P. Heritage, O. Solgaard, "Scalable optical cross-connect switch using micromachined mirrors," *IEEE Photonics Technology Letters*, Vol. 12, No. 7, pp. 882–884, July 2000; H. Laor, "Compact optical matrix switch with fixed location fibers," U.S. Pat. No. 6,097,860, Aug. 1, 2000; O. Solgaard, J. P. Heritage, and A. R. Bhattaral, "Multi-wavelength cross-connect optical switch," U.S. Pat. No. 6,097,859, Aug. 1, 2000; M. T. Fatchi and J. E. Ford, "Free-space optical signal switch arrangement," U.S. Pat. No. 6,002,818, Dec. 14, 1999; R. L. Jungerman and D. M. Braun, "Optical cross-connect switch using a pin grid actuator," U.S. Pat. No. 5,841,917, Nov. 24, 1998; F. H. Levinson, "Optical matrix switch," U.S. Pat. No. 4,580,873, Apr. 8, 1986; G. J. G. Broussaud, "Optical switch for a very large number of channels," U.S. Pat. No. 4,365,863, Dec. 28, 1982; T.-K. Koo, "Optoelectronic data entry means having plurality of control means to direct part of radiation in channel from radiation source to output channel," U.S. Pat. No. 3,548,050, Mar. 7, 1972; D. T. Neilson, V. A. Aksyuk, S. Arney, N. R. Basavanhally, K. S. Bhalla, D. J. Bishop, B. A. Boie, C. A. Bolle, J. V. Gates, A. M. Gottlieb, J. P. Hickey, N. A. Jackman, P. R. Kolodner, S. K. Korotky, B. Mikkelson, F. Pardo, G. Raybon, R. Ruel, R. E. Scotti, T. W. Van Blarcum, L. Zhang, and C. R. Giles, "Fully provisioned 112×112 micro-mechanical optical crossconnect with 35.8 Tb/s demonstrated capacity," OFC Technical Digest, Postdeadline, pp.PD12-1-PD12-3, Baltimore, Md., March 2000; H. Laor, J. D'Entremont, E. Fontenot, M. Hudson, A. Richards, and D. Krozier, "Performance of a 576×576 optical cross connect," National Fiber Optic Engineers Conference, pp. 276–281, Chicago, Ill. September 1999; L. Y. Lin, E. L. Goldstein, J. M. Simmons, and R. W. Tkach, "High-density micromachined polygon optical crossconnects exploiting network connection-symmetry," IEEE Photonics Technology Letters, Vol. 10, No. 10, pp. 1425–1427, October 1998.

Single pixel per beam MEMS-based variable FO attenuators have also been proposed such as described in J. E. Ford and J. A. Walker, "Dynamic spectral power equalization using micro-opto-mechanics," *IEEE Photonics Technology Letters*, Vol. 10, No. 10, pp. 1440–1442, October, 1998, V. Askyuk, B. Barber, C. R. Giles, R. Ruel, L. Stulz, and D. Bishop, "Low insertion loss packaged and fibre connectorized MEMS reflective optical switch," *IEE Electronics Lett.*, Vol. 34, No. 14, pp. 1413–1414, Jul. 9, 1998, and B. Barber, C. R. Giles, V. Askyuk, R. Ruel, L. Stulz, and D. Bishop, "A fiber connectorized MEMS variable optical attenuator," *IEEE Photon. Technol. Lett.*, Vol. 10, No. 9, pp. 1262–1264, September 1998. Apart from the tolerance limited single pixel control approach, attenuation control in these modules is implemented in an analog fashion by carefully moving a micromirror per beam (or wavelength) through a continuous range of positions. For instance, in both the cited V. Askyuk, et.al. designs, a micromirror is linearly translated to partially block a beam and hence cause attenuation. In the J. Ford, et.al. design case, a micromirror is translated through many small sub-micron size steps to form a varying reflection surface, and this ultra-small motion makes the module very sensitive to vibrations. Thus, extensive module calibration and costly and complex control electronics are required to maintain the high performance of these analog-type FO MEMS-based modules. Other related works on mechanical or MEMS based VOAs are described in works such as V. A. Aksyuk, D. J. Bishop, P. L. Gammel, C. R. Giles, "Article comprising a light actuated micromechanical photonic switch," U.S. Pat. No. 6,075,239, Jun. 13, 2000; E. E. Bergmann, D. J. Bishop, "Moving mirror switch," U.S. Pat. No. 6,031,946, Feb. 29, 2000; P. Colbourne, J. Obhl, N. Teltelbaum, "Variable optical attenuator," U.S. Pat. No. 5,915,063, Jun. 22, 1999; J. E. Ford, K. W. Goossen, "Level setting optical attenuator," U.S. Pat. No. 5,900,983, May 4, 1999; C. M. Garrett, C Fan, D. Cugalj, D. Gransden, "Voltage controlled attenuator," U.S. Pat. No. 5,745,634, Apr. 28, 1998; J. E. Ford, D. A. B. Miller, M. C. Nuss, J. A.

Walker, "Attenuation device for wavelength multiplexed optical fiber communications," U.S. Pat. No. 5,745,271, Apr. 28, 1998; R. Wood, V. Dhuler, E. Hill, "A MEMS variable optical attenuator," 2000 IEEE/LEOS International Conf. on Optical MEMS, pp. 121–122, Kauai, Hi. 21–24 August 2000; K. W. Goossen, J. A. Walker, D. T. Neilson, J. E. Ford, W. H. Knox, "Micromechanical gain slope compensator for spectrally linear optical power equalization," IEEE Photonic Technology Letters, Vol. 12, No. 7, pp.831–833, July 2000; F. Chollet, M. de Labachelerie, H. Fujita, "Compact evanescent optical switch and attenuator with electromechanical actuation," IEEE Journal of Selected Topics in Quantum Electronics, Vol.5, No. 1, January/February, 1999; F. Chollet, M. de Labachelerie, H. Fujita, "Electromechanically actuated evanescent optical switch and polarization independent attenuator", Proc. IEEE MEMS Conf., pp.476–481, 1998.

It is very important to note that all the above works cited in mechanically motivated and optical MEMS-related components or subsystems use the principle of "a single mirror element controls a single fiber-optic beam." This is unlike the proposed embodiments in this application where a "Macro-pixel" or multiple mirrors controls a single optical beam.

Many advanced optical networking applications require subsystems that can simultaneously and independently control various parameters of an optical beam, such as amplitude level, time delay, and routing path. The need and method to accomplish parts of these tasks has been pointed out in such works as N. A. Riza, "High Speed Fiber-Optic Switch," U.S. Pat. No. 6,282,336, issued Aug. 28, 2001, and in N. A. Riza and S. Sumriddetchkajorn, "Micromechanics-based Wavelength Sensitive Fiber-Optic Beam Control Structures and Applications," Applied Optics, Vol. 39, No. 6, pp. 919–932, Feb. 20, 2000, and N. Antoniades, et.al., "Engineering the performance of DWDM metro networks," NFOEC 2000 Conf. Proc., pp. 204–211, Denver, Aug. 27–31, 2000.

It is the purpose of this application to introduce FO processors that have the capability to independently and simultaneously accomplish these key tasks of controlling optical beam amplitude level and routing path on a per wavelength basis. It is also the purpose of this application to introduce a processor that accomplishes simultaneous broadcasting of optical signals to different ports of the switch. These processors are unique in their use of a digitally controlled FO module using optical MEMS-based macro-pixel devices to form compact and fault-tolerant multiwavelength structures to simultaneously accomplish the gain and routing beam processing tasks. Specifically, these processors and their beam control submodules incorporate the unique "macro-pixel" approach to beam controls that has been introduced by N. A. Riza in earlier works such as described in N. A. Riza, "Fault-tolerant fiber-optical beam control modules," U.S. Pat. No. 6,222,954, issued Apr. 24, 2001; N. A. Riza and S. Sumriddetchkajorn, "Digitally controlled fault-tolerant multiwavelength programmable fiber-optic attenuator using a two dimensional digital micromirror device," *Optics Letters*, Vol. 24, No. 5, pp. 282–284, Mar. 1, 1999; N. A. Riza and S. Sumriddetchkajorn, "Small tilt micromirror device-based multiwavelength three-dimensional 2×2 fiber-optic switch structures," *Optical Engineering*, Vol. 39, No. 2, pp. 379–386, February 2000; and N. A. Riza and S. Sumriddetchkajorn, "Fault-tolerant dense multiwavelength add-drop filter with a two-dimensional digital micromirror device," *Applied Optics*, Vol. 37, No. 27, pp. 6355–6361, Sep. 20, 1998. This application is the first disclosure of macro-pixels based on digital operation small tilt micromirrors coupled with a fiber collimator lens used simultaneously to accomplish the tasks of light routing and amplitude controls with broadcast capability. Specifically, it is shown how several processors for WDM signal controls can be devised using a macro-pixel based optical beam control module. The simultaneous yet independent routing and gain control attributes for any wavelength of proposed fault-tolerant processors make them a powerful conditioning tool for optical beams in WDM fiber-optic networks and is the subject of this invention.

BRIEF DESCRIPTION OF THE DRAWINGS

For a better understanding of the present invention, reference may be had to the following detailed description taken in conjunction with the accompanying drawings in which:

FIG. 1a illustrates a retroreflective architecture N-wavelength Add-Drop processor using specially designed beam control modules based on optical MEMS;

FIG. 1b is an enlarged view of element A if FIG. 1a;

SUMMARY DESCRIPTION OF THE INVENTION

Multi-wavelength fiber-optic processors based on a unique fault-tolerant scheme using a macro-pixel to control an optical beam are disclosed. The disclosed macro-pixel invention uses multiple device pixels per beam to provide a robust digital technique for amplitude control and routing thereby creating a module with high optical beam alignment tolerance and resistance to catastrophic failure. A preferred embodiment of the invention is implemented via small tilt micromirrors fabricated with optical microelectromechanical systems (MEMS) technology. This embodiment provides fault tolerant fiber-optic processors that can implement add-drop wavelength routing, optical power level conditioning per wavelength, and 2×2 optical crossconnects. Specifically, the disclosed processor can simultaneously and independently implement optical power conditioning and wavelength routing for any wavelength channel, realizing a powerful processor. The basic control modules in the processors use a fiber lens collimator, at most four linearly displaced fibers butt-coupled to the fiber lens, and one optical MEMS-based macro-pixel device with at most three independently controllable tilt mirror states. The processors can be interconnected to realize a crossconnect subsystem of multiple attenuators and switches that can be applied to N-wavelength multiplexed fiber-optic networks. The processors can be interconnected to form broadcast 1×N and M×N optical switches with independent gain controls.

DETAILED DESCRIPTION OF THE INVENTION

Figure 1C:
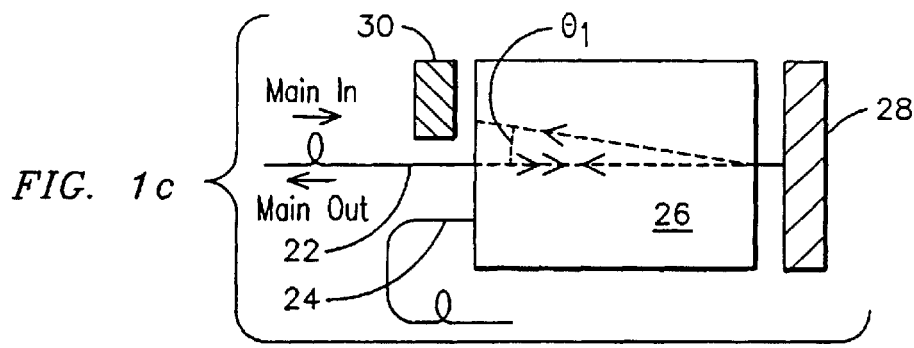
FIG. 1c shows element A of FIG. 1 in a drop mode.

Referring to FIG. 1a, there is shown one embodiment of a retroreflective architecture N-wavelength Add-Drop processor 10 using beam control modules based on optical MEMS. This processor can accomplish gain conditioning for both add and drop signals or a main signal. Light containing N wavelengths labeled as $\lambda 1, \lambda 2, \ldots, \lambda N$ enter the processor from the Main IN fiber port 12. These wavelengths pass through a first circulator device 14 and enter a fiber coupled 1:N wavelength division multiplexer (WDM) device 16 that physically separates the wavelengths into independent output fiber ports 18 labeled a to N where N can be any number. These N wavelengths then enter N fiber connected beam control modules 20a–20n. Each module 20 uses two fiber ports 22, 24, one fiber collimator lens 26, and one 3-state optical MEMS macro-pixel micromirror device 28. The top module 20a (see FIG. 1c) is set in retroreflective main in/main out mode for wavelength λ1 with any excess λ1 power blocked at the noise block 30. Hence, as shown, λ1 retroreflects in the module 20a and travels back to the first WDM device 16 and exits from a Main Out port 32 of the circulator 14. Because gain control may be required for the incoming λ1, some of the micromirrors in module 20a may be set in a non-retroreflective mode to direct part of the optical energy to the noise block 30. In this way, module 20a can independently control the amplitude and routing direction of the input wavelength λ1. In comparison, the bottom module 20n (see FIG. 1b) may be set in a non-retroreflective add in/drop out mode where wavelength λN is dropped out of the network and wavelength λ'N is added into the network main flow signals. Here, the required micromirrors in module 20n are set to direct the λN drop signal labeled D to the non-retroreflective port 24 of module 20n and simultaneously direct the λ'N add signal labeled A to the other non-retroreflective port 22 of module 20n. In this example, two reject path rays A and D are generated towards the noise block 30 so that optical gain control for both the add and drop wavelength λ'N is executed. Note that because the same optical path is followed by both the add and drop wavelength in the module 20n, the add and drop wavelengths in this processor acquire the same value of gain control limiting the total flexibility of the processor. One embodiment of this invention addresses this issue. As shown in FIG. 1a, the ports 24 are of modules 20 are connected to ports 34a–34n of a second WDM device 36 identical to device 16. Device 36 is connected to a second fiber-connected circulator 38 that provides an add port 40 and a drop port 42. The light signal λ'N is input to the processor 10 via the add port 40 of the second circulator 38. The signal λN is dropped from the processor 10 via the drop port 42 of this second circulator 38.

Figure 1D:
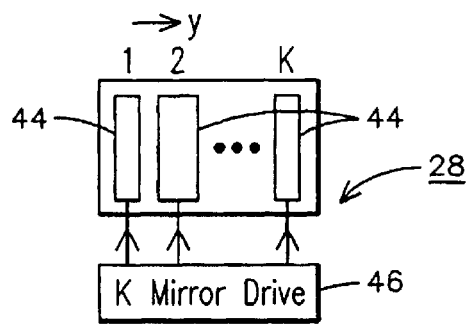
FIG. 1d shows a typical structure of a macropixel MEMS device consisting of K micromirrors, each mirror with its predetermined size and placement.

FIG. 1d illustrates one example of a macropixel MEMS device, such as device 28, consisting of K micromirrors where K represents a number of individual micromirrors 44, each mirror having a predetermined size and placement. All micromirrors 44 are designed to maintain three tilt states, i.e., tilt angles of flat or 0 degrees, $-\theta_2/2$, and $+\theta_1/2$. The dashed lines A,D in the fiber collimators 26 represent the central or chief rays for the converging/diverging light beams. The fiber lens output/input beams at the lens-freespace boundary are collimated or parallel beams with various angle of direction with respect to the central axis of the fiber-lens. These angles can be 0 degrees, $-\theta_2$, $+\theta_1$, and $\theta_1+\theta_3$, and depend on whether module 20 operates in the add/drop mode of FIG. 1b or the main in/main out mode of FIG. 1c. For the main in/main out mode, the micromirrors 44 are set to two tilt angles of 0 degrees (signal main in to main out) and $+\theta_1/2$ (main in to noise block) with respect to the central fiber lens axis which also is retroreflective with the top fiber port. For the add/drop mode, the micromirrors 44 are set to two tilt angles of $+\theta_1/2$ degrees (signals A to noise block and signals D to noise block) and $-\theta_2/2$ (signals A to D and D to A) with respect to the central fiber lens axis. As mentioned in the earlier cited N. A. Riza works, amplitude control for the beams is set by selecting which mirrors in the macropixel are set to which desired tilt states of each micromirror. In module 26, the micromirror is required to have 3 independent tilt states. The angles on these tilt states depends on the type of fiber lens used plus the size and placement of the fiber cores that are butt coupled or located near one facet of the fiber lens. Hence, any number of tilt angle designs for the macropixel mirror based device/chip can be chosen for making a module 26 with low loss and minimum crosstalk. This macropixel design used in module 26 to make a multi-wavelength processor is a feature of this invention. Note that any other reference axis for design of module 26 can also be chosen, implying that the tilt angles have the same relative tilts but perhaps different absolute plus or minus values in degrees. The tilt angles of the micromirrors are controlled by drive unit 46 in accordance with specifications from the micromirror or manufacturer.

Figure 2A:
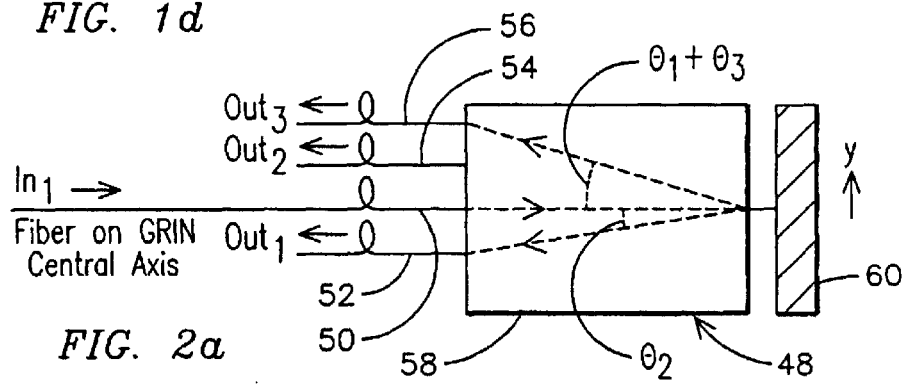
FIG. 2a shows a beam control module "B" using four fiber ports (one in and three out), one fiber collimator lens, and one 3-state optical MEMS macro-pixel micromirror device set in the main in-main out mode where light input from IN1 travels partly to OUT1 and partly to the power monitoring port OUT3.
Figure 2B:
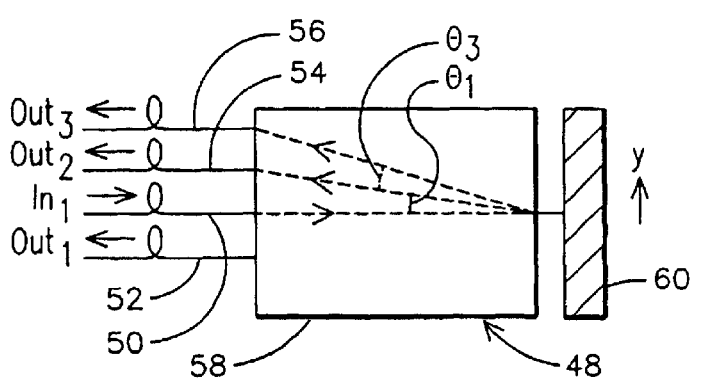
FIG. 2b shows device B set in the add in-drop out mode where light input from IN1 travels partly to OUT2 and partly to the power monitoring port OUT3.

FIGS. 2a and 2b illustrate another form of beam control module 48 having four fiber ports 50, 52, 54 and 56 (one in and three out), one fiber collimator lens 58, and one 3-state optical MEMS macro-pixel micromirror device 60. Module 48 is essentially the same in design as module 26 in FIG. 1, except that two fibers have been added to receive light signals that were previously directed into noise block 30. The angle notations $\theta_1, \theta_2, \theta_3$ are the same as for module 26 in FIG. 1. Module 48 basically works as a 1×2 FO switch that has independent optical gain control capability for the input signal. This again is possible through the "Macropixel" fiber-optic beam control approach described above. Module 48 in FIG. 2a is set in the main in/main out mode where light input from IN1 port 50 travels partly to OUT1 port 52 (i.e., using micromirror setting of $-\theta_2/2$ degrees) and partly to a power monitoring port OUT3 port 56 (i.e., using micromirror setting of $(\theta_1+\theta_3)/2$ degrees). In FIG. 1b, module 48 is set in the add in/drop out mode where light input from IN1 port 50 travels partly to OUT2 port 54 (i.e., using micromirror setting of $-\theta_1/2$ degrees) and partly to the power monitoring port 56 (i.e., using micromirror setting of $(\theta_1+\theta_3)/2$ degrees). Thus the light coming in from IN1 port 50 can be sent either to ports 52 and 54, with the desired level of independent power controls. Again, the typical structure of the macropixel MEMS device used to make module 48 comprises K micromirrors, each mirror with its predetermined size and placement. All micromirrors are designed to maintain three tilt states, i.e., tilt angles of flat or $+\theta_2/2$, $\theta_1/2$ and $(\theta_1+\theta_3)/2$. This notation is again based on the FIG. 1b fiber lens central axis reference and the relative tilt state values that are important when designing these modules.

Figure 3A:
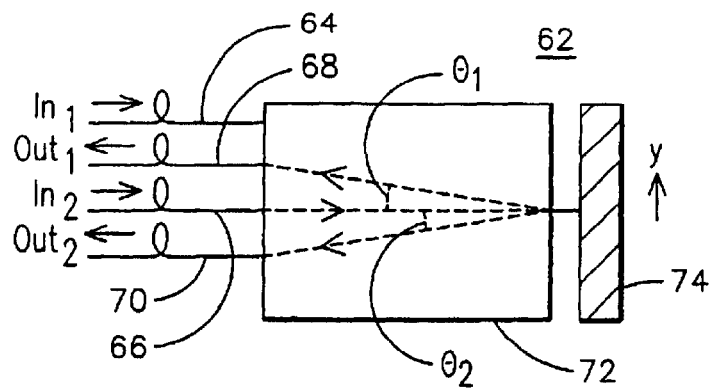
FIG. 3a shows beam control module using four fiber ports (two in and two out), one fiber collimator lens, and one 3-state optical MEMS macro-pixel micromirror device set in the drop mode where light input from IN2 travels partly to OUT1 and partly to the power monitoring port OUT2.
Figure 3B:
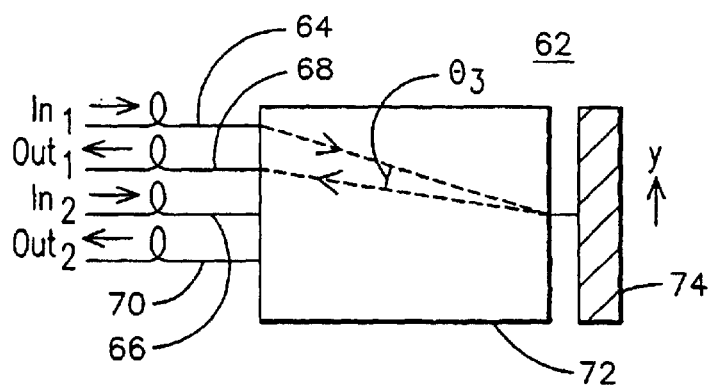
FIG. 3b shows device C set in the main in-main out mode where light input from IN1 travels to OUT1.

FIGS. 3a and 3b illustrate another form of beam control module 62 using four fiber ports 64, 66, 68, 70 (two in and two out), one fiber collimator lens 72, and one 3-state optical MEMS macro-pixel micromirror device 74. Module 62 is similar in design to module 48. The key difference is that in module 62, the fiber ports are labeled and used differently, and the macropixel micromirror device 74 has different tilt states. Specifically, module 62 has two input fiber ports labeled IN1 and IN2 and two output ports labelled OUT1 and OUT2. In FIG. 3a, module 62 is set in the drop mode where light input from IN2 port 64 travels partly to OUT1 port 68 (i.e., using micromirror setting of $f_1/2$ degrees) and partly to a power monitoring OUT2 port 70 (i.e., using micromirror setting of $-\theta_2/2$ degrees). In FIG. 3b, module 62 is set in the main in/main out mode where light input from IN1 port 64 all travels to OUT1 port 68 (i.e., using micromirror setting of $(\theta_1+\theta_3/2)$ degrees). Thus the light coming in from IN1 port 64 is sent to OUT1 port 68, while light coming in from IN2 port 66 is sent partly to OUT1 port 68 and partly to the power monitoring port 70 to get the desired level of independent power controls. Again, the typical structure of the macropixel MEMS device used to make module 62 consists of K micromirrors, each mirror with its predetermined size and placement. All micromirrors are designed to maintain three tilt states, i.e., tilt angles of flat or $-\theta_2/2$, $\theta_1/2$, and $(2\theta_1+\theta_3)/2$, considering the central fiber lens reference axis aligned with the IN2 port 66.

Figure 4:
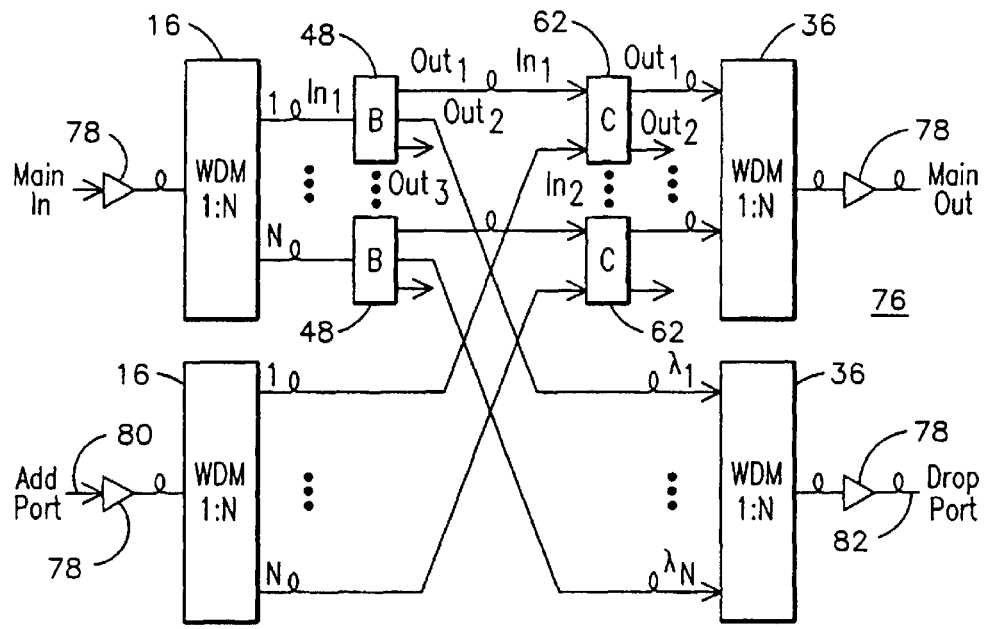
FIG. 4 shows devices B and C with four 1:N WDM devices to form a fully programmable N-wavelength A-D processor with completely independent routing and gain controls of all wavelengths through both main-in main-out mode and A-D mode.

FIG. 4 illustrates an add/drop processor 76 using the devices 48 and 62 with four 1:N WDM devices 16 or 36 to form a fully programmable N-wavelength A/D processor with completely independent routing and gain controls of all wavelengths through both main-in/main-out mode and add/drop mode. Hence, unlike the processor 10 in FIG. 1, the processor 76 can independently control the optical power levels of add and drop signals. The operation of the processor 76 is otherwise similar to the processor 10 in FIG. 1. Device 48 and device 62 form a set that contains the beam amplitude control features. The specific macropixel settings used for devices 48 and 62 are described with regard to FIG. 2 and FIG. 3. Conventional optical amplifiers 78 buffer the input and output signals of the processor 76.

It would be highly desirable to realize a fully symmetric 2×2 switching processor architecture that could be used to make larger N×M multiwavelength crossconnects. The processors 10, 76 in FIG. 1 and FIG. 4 are add/drop processors and may not be useful to implement a 2×2 router. For example, the add signals from the Add port 80 of the processor 76 cannot flow to the drop port 82 of the processor. Hence, the processor 76 cannot be used as a basic 2×2 building block for a N×M large crossconnect.

Figure 5:
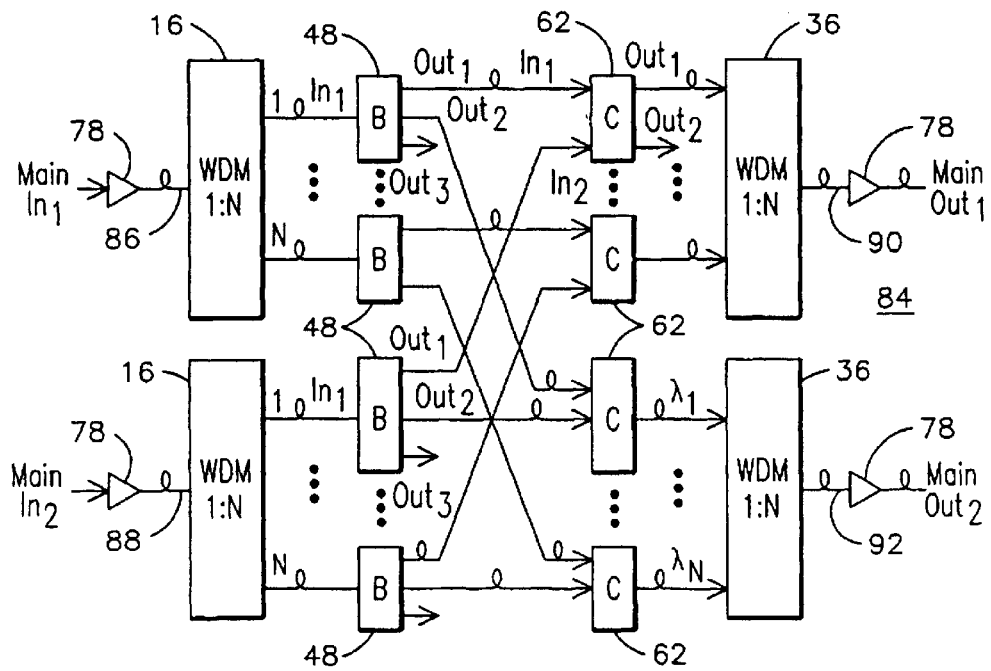
FIG. 5 shows how devices B and C of FIGS. 2–3 can be used with four 1:N WDM devices to form a fully programmable N-wavelength 2×2 crossconnect subsystem with completely independent routing and gain controls of all wavelengths through both straight state mode and crossed state mode.

FIG. 5 shows a modified processor 84 that solves the 2×2 switching processor issue. Specifically, FIG. 5 shows devices 48 and 62 used with four 1:N WDM devices (two devices 16 and two devices 36) to form a fully programmable N-wavelength 2×2 crossconnect subsystem with completely independent routing and gain controls of all wavelengths through both straight state mode and crossed state mode. In this case, device 48 is a 3-state module while device 62 is a 2-state module. The key design change compared to the processor 76 is that the number of devices 48 and 62 are doubled, i.e., a new set of devices 48 and 62 are added between the second pair of WDM devices 16 and 36 which couple the IN2 and main OUT2 ports. The processor 84 has two input ports labeled Main IN1 (port 86) and Main IN2 (port 88), and two output ports labeled Main OUT1 (port 90) and Main OUT2 (port 92). The states of this processor are Main IN1 to Main Out 1, Main IN2 to Main Out 2, Main IN1 to Main Out 2, and Main IN2 to Main Out 1. These configurations can be applied to any input wavelength of the N-wavelength set entering the processor 84 via its two input ports 86, 88. The specific macropixel settings used for devices 48 and 62 are described in FIG. 2, FIG. 3, and FIG. 5. Devices 48 contain the beam amplitude control features while devices 62 act as 2×1 switch arrays.

Figure 6A:
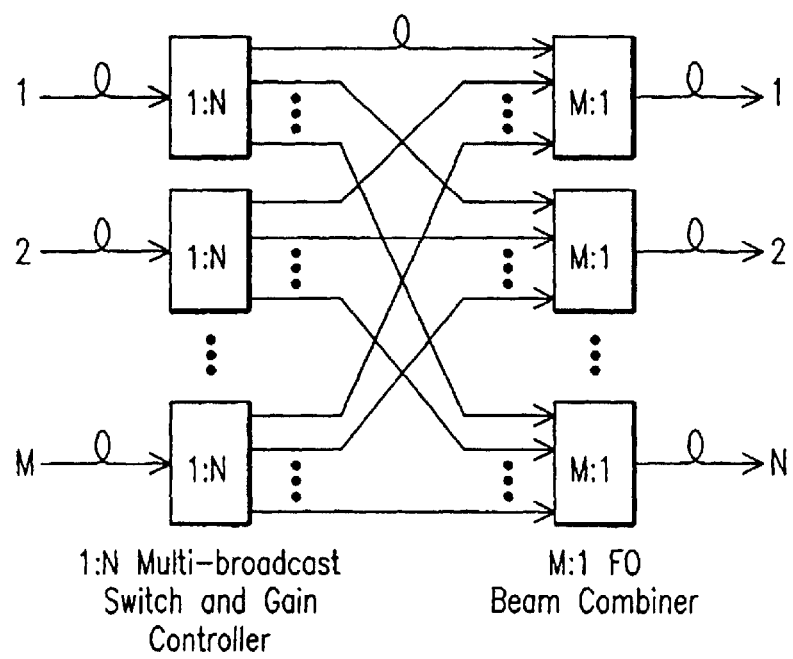
FIG. 6a shows device B used to form a M×N multi-broadcast crossconnect optical switch with independent gain controls per output port.
Figure 6B:
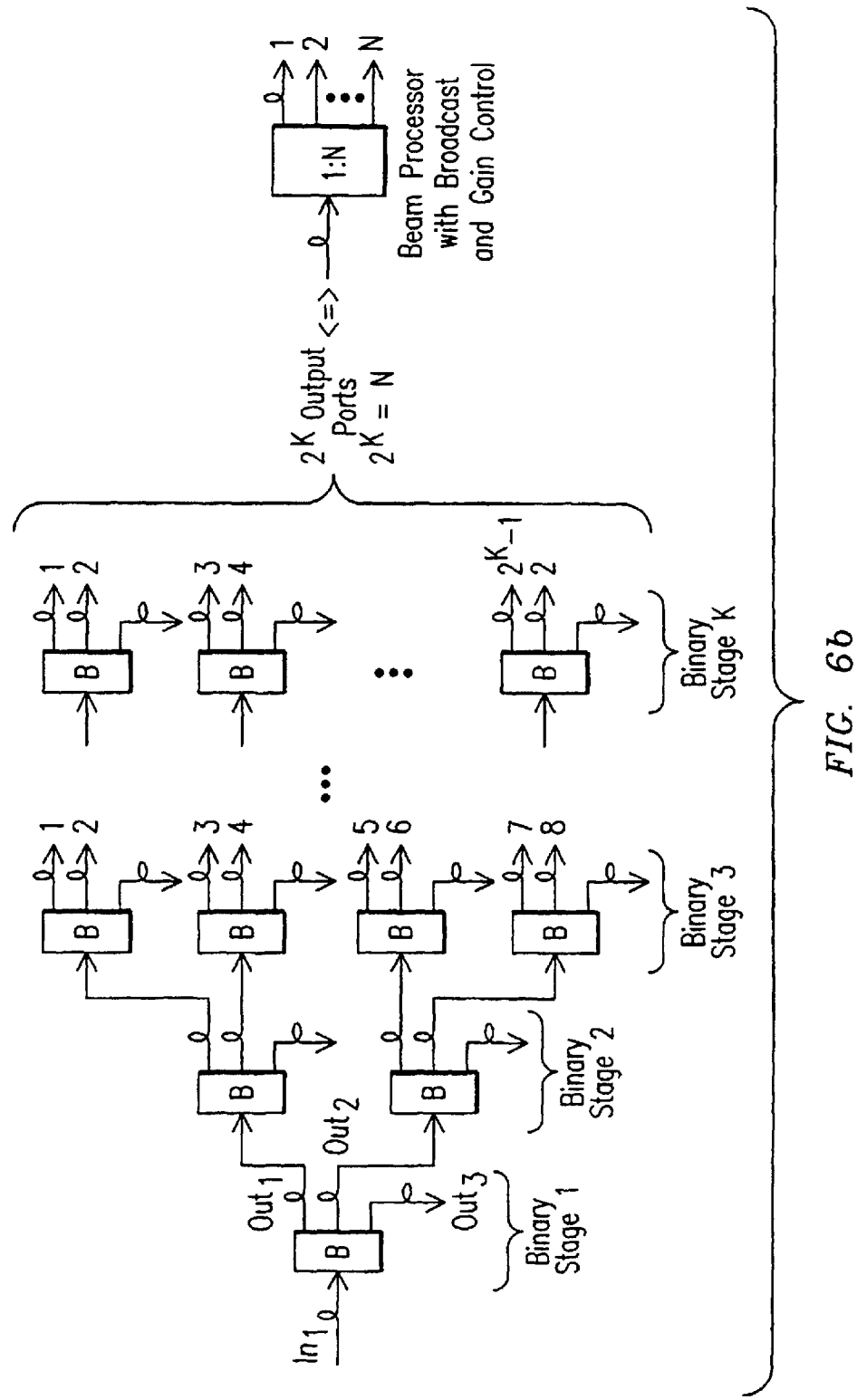
FIG. 6b shows device B in K binary tree stages interconnected to realize a 1×N multi-broadcast optical switch with independent gain controls per output port.

In some network applications such as a M×N broadband optical crossconnect system, it is desirable to be able to simultaneously broadcast desired levels of an input optical signal to several output ports of a switch. This capability should exist for any of the N input signals introduced via the independent N input fiber ports. In prior art systems, this capability is severely constrained because optical switches for routing operate in a strictly digital routing format, i.e., for a simple most common 1×2 optical micromirror-based switch, all light either gets routed to one output port or the other output port, but not simultaneously to both output ports with a desired level of optical power distribution. The device 48 of the present invention provides broadcast and gain control capability at all output ports. FIG. 6a shows one arrangement of devices 48 used to form a M×N multi-broadcast crossconnect optical switch with independent gain controls per output port. FIG. 6b shows how devices 48 in K binary tree stages (stage 1 through stage K) interconnected to realize a 1×N multi-broadcast optical switch 94 with independent gain controls per output port. This 1×N switch is used to create the M×N crossconnect in FIG. 6a. In these examples, device 48 is a 3-state module and is used to implement an optically broadband (or wavelength independent) M×N crossconnect switch with independent optical gain controls across all output ports and simultaneous multi-broadcast capability of the N input signals to the M output ports.

What is claimed is:

1. An optical switching device comprising:
    an optical collimator having an input port and at least one output port;
    a micromirror device coupled to said collimator and arranged to selectively reflect optical signals entering said input port to said output port; and
    said micromirror device comprising an array of micromirrors arranged in N groups of K micromirrors, where N and K are each greater than one and N represents the number of wavelengths contained within the optical signals, whereby each wavelength of the optical signals can be independently attenuated by controlling the reflecting angle of each of the plurality of K micromirrors in the group of micromirrors associated with each respective wavelength.

2. The optical switching device of claim 1 and including a plurality of output ports, said micromirror device being operable to selectively reflect optical signals to one or more of said output ports in controllable amounts.

3. The optical switching device of claim 1 wherein said at least one output port is coupled for receiving another optical signal, said micromirror device being controllable to direct at least a portion of the optical signal entering said input port to said output port and to direct at least a portion of the optical signal entering said output port to said input port.

4. The optical switching device of claim 1 and including another output port and a light absorber coupled to said another output port, said micromirror device being operable to direct at least a portion of the optical signal into said another output port for attenuating light reflected to other ports.

5. An optical signal processor comprising:
a first optical switching device having an input port and at least two output ports;
a second optical switching device having at least two input ports and at least one output port, one of said output ports of said first optical switching device being coupled to one of said input ports of said second optical switching device, said processor having one output port for outputting optical signals from said output port of said second optical switching device and having a second output port for outputting optical signals from another of said output ports of said first optical switching device and
each of said optical switching devices comprising an array of micromirrors arranged in N groups of K micromirrors, where N and K are each greater than one and N represents the number of wavelengths contained within the optical signals, whereby each wavelength of the optical signals can be independently attenuated by controlling the reflecting angle of each of the plurality of K micromirrors in the group of micromirrors associated with each respective wavelength.

6. The optical signal processor of claim 5 wherein the optical switching devices comprise optical collimators operatively coupled to micromirror devices for selectively switching input optical signals to said output ports.

7. The optical signal processor of claim 6 and including an optical multiplexer for separating said input optical signals into a plurality of wavelength dependent signals, each of said wavelength dependent signals being processed through identical sets of said first and said second optical switching devices to provide a plurality of independently controlled optical output signals.

8. The optical signal processor of claim 7 and including an optical demultiplexer coupled for receiving said plurality of wavelength dependent, controlled optical output signals and for combining said signals into a composite optical output signal.

9. The optical signal processor of claim 5 and including a plurality of first and second optical switching devices, wherein each of said another of said output ports of each of said first optical devices is coupled to another one of said input ports of a different one of said second optical switching devices.

10. The optical signal processor of claim 9 wherein said first and second optical switching devices comprise a first set of devices coupled between a first pair of input to output devices and a second set of devices coupled between another pair of input to output devices, said another of said output terminals of said first optical switching devices in said first set of devices being coupled to said another one of said input ports of said second optical devices in said second set, and said one of said output ports of said first optical switching devices being coupled to said one of said input ports of said second optical switching devices in a same set.

* * * * *